H. A. BUDDE.
CLUTCH.
APPLICATION FILED JAN. 8, 1912.

1,043,566.

Patented Nov. 5, 1912.

Fig. 1.
Fig. 2.
Fig. 3.
Fig. 4.
Fig. 5.
Fig. 6.

Witnesses:
L. L. Markel
F. M. Taylor

Inventor:
H. A. Budde
By his Attorneys,
Sutherland & Anderson

UNITED STATES PATENT OFFICE.

HENRY A. BUDDE, OF MANCHESTER, CONNECTICUT.

CLUTCH.

1,043,566. Specification of Letters Patent. Patented Nov. 5, 1912.

Application filed January 8, 1912. Serial No. 670,004.

*To all whom it may concern:*

Be it known that I, HENRY A. BUDDE, a citizen of the United States, residing at Manchester, in the county of Hartford and State of Connecticut, have invented certain new and useful Improvements in Clutches, of which the following is a specification.

This invention relates to clutches, and while I do not restrict myself to the incorporation of the invention in any particular type of clutch, said invention has peculiar utility when embodied in a friction clutch provided with an expansible ring and an operating lever therefor, the primary object of the invention being to provide simple and effective means for securely holding such an operating lever (or levers) in position and also in providing means possessing similar attributes for holding the take-up screw or screws which operate in connection with a fulcrum or contact block or blocks carried by said lever or levers.

In the drawings accompanying and forming part of the present specification I have shown in detail one of the many convenient forms of embodiment of the invention which to enable those skilled in the art to practice the same will be set forth fully in the following description, while the novelty of said invention will be included in the claims succeeding said description from which statement it will be clear that I do not restrict myself to the showing made by said drawings and description. I may depart therefrom in several respects within the scope of the invention included by said claims.

Referring to said drawings: Figure 1 is a longitudinal sectional view of transmission gearing provided with clutch mechanism including my invention. Fig. 2 is a plan view of a pair of expanding ring operating levers. Fig. 3 is a cross section on the line 3—3 of Fig. 1. Fig. 4 is a sectional view on the line 4—4 of Fig. 2. Fig. 5 is a sectional view on the line 5—5 of Fig. 4. Fig. 6 is a like view on the line 6—6 of Fig. 2.

Like characters refer to like parts throughout the several figures of the drawings, which it will be observed are on different scales.

While I do not restrict myself to the employment of the clutch mechanism in any particular connection, the same is illustrated as used in conjunction with or as part of transmission gearing such as shown in Letters Patent No. 1,001,615 granted to me on August 29, 1911 and to which reference may be had, an improvement of said transmission gearing involving said clutch mechanism being also illustrated in my copending application Serial No. 670,003, filed January 8, 1912. In view of these reasons it is not necessary for me to describe the transmission gearing in detail, although the same might be denoted in a general way by 10. Said transmission gearing involves a clutch member 11 which is keyed to the driving shaft 12, and although this clutch member 11 may be of any suitable form it is shown as a cup and as inclosing the split or divided friction ring 13 rotative with the gear carrier 14. When the ring 13 is expanded into frictional engagement with the inner surface of the cup or clutch member 11, the gear carrier 14 will be connected to and will rotate with the said shaft 12, provided the latter be in motion. Between the ends of the divided ring are mounted companion rocking or swinging levers 15 and 16 provided with fulcrum or contact blocks 17 and 18 and also provided with outwardly extending semi-circular lugs 19 and 20 adapted to engage corresponding seats or apertures in the ends of said split or divided ring. The contact or fulcrum blocks 17 and 18 engage each other. When the tails of the two levers 15 and 16 are spread the ring 13 will be expanded into frictional engagement with the cup 11 to accomplish the function already mentioned. The contact or fulcrum blocks are adjustable, depthwise of the levers 15 and 16 for the purpose of taking up wear therein, and they are operatively connected so that when one is moved through some primary agency the other one will be correspondingly shifted. One of the blocks may be provided with a pin 21 to extend into an opening in the other, the pin in the present case being on the block 18 which is directly operated by an adjusting member such as the screw 22 which in the present case is tapped into the lever 16. The foregoing is a general description of a known type of clutch in which my invention is incorporated. As this form of clutch is common it is needless for me to describe the same further in detail. It has been a difficult matter to properly hold this adjusting screw in its seat and various expedients have been adopted to accomplish this end, none of them being wholly satisfactory. It has been the practice to split or divide the screw-carrying lever in such way that said lever will yieldingly embrace the screw, and this hugging of the screw by the carrying lever has heretofore been utilized to prevent movement of the screw. Under all circumstances this is not altogether successful. In addition to this the labor of kerfing said screw carrying lever was bothersome and the operation was attended by some expense. I provide means for securely holding said screw in place without kerfing, cutting or otherwise weakening its carrying lever, and although I do not restrict myself to the means now to be specifically described, the same has been found particularly advantageous. The screw 22 is provided with an annular flange 23 which is set in the counterbore 24 of the lever 16, the block 18 having a groove or channel 25 to receive said flange or annular projection 23. It will, therefore, be clear that when the screw 22 is turned into its seat, the block 18 and hence the block 17 through its described connection with the block 18 can be adjusted to take up wear. The annular flange 23 is provided with a circumferential continuous groove 26 to receive the divided or split spring ring 27 which is first opened out and then sprung into said groove so that when the said flange 23 is in the counterbore 24, the spring can engage the wall of the counterbore and thus effectually and securely hold the screw against accidental movement such as would occur on vibration. The screw can be freely adjusted, however, to take up wear in the manner already indicated.

When the clutch is in action there is a strong tendency, due to centrifugal force, to displace the levers 15 and 16 which, as will be understood are sustained by the part 14 which has been described as a gear carrier, and it has been the custom to positively connect said levers with the ends of the clutch ring 13 to overcome this possibility. The levers have been connected with the ring in various ways more or less complex and entailing milling operations. I prevent said levers being thus thrown out in a very simple, inexpensive manner, the screw 28 being provided in the present instance to secure said result. The shank of said screw 28 is tapped into the gear carrier 14 between the two levers 15 and 16 which have notches each denoted by 29 in their adjacent or opposite faces to receive the said shank. The head 30 of said screw 28 overlies the outer faces of the two levers and is in contact or substantially in contact with said surfaces so as to effectually prevent accidental displacement of said levers, said head being made of sufficient diameter as to prevent the disadvantage mentioned when said levers are spread or separated a predetermined extent.

What I claim is:

1. A clutch comprising a resilient ring and an expanding lever therefor, said lever being provided with a contact block and with a screw for adjusting said contact block, and a spring carried by the screw, the lever having a surface engageable by said spring to thereby prevent accidental movement of the screw.

2. A clutch comprising a resilient ring and an expanding lever therefor, said lever being provided with an adjustable member and with a screw for adjusting said adjustable member, and a locking spring, the screw having a groove to receive said locking spring, and the latter engaging the lever to prevent accidental movement of said lever.

3. A clutch comprising a resilient ring and an expanding lever therefor, said lever being provided with a contact block and with a screw for adjusting said block, the screw having an annular flange and the lever having a counterbore to receive said flange, and a divided spring ring, said flange having an annular groove into which said divided ring is sprung and the spring ring being adapted to engage the surface of said counterbore to prevent accidental movement of said screw.

4. A clutch comprising a resilient ring, a pair of expanding rocking levers for said ring, a supporting body for the levers and ring, and a member having a fixed relation with respect to both of said levers and provided with retaining means overlying both the levers.

5. A clutch comprising a resilient ring, a pair of expanding rocking levers for said ring, a supporting body for the levers and ring, having a fixed relation with respect to said levers, and a screw tapped into said supporting body between the levers, the screw having a head overlying both levers.

In testimony whereof I affix my signature in presence of two witnesses.

HENRY A. BUDDE.

Witnesses:
 JOSIE A. SULLIVAN,
 NELLIE A. COWLES.

---

Copies of this patent may be obtained for five cents each, by addressing the "Commissioner of Patents, Washington, D. C."